United States Patent [19]

Musch et al.

[11] Patent Number: 5,210,152
[45] Date of Patent: May 11, 1993

[54] PROCESS FOR THE VULCANIZATION OF POLYCHLOROPRENE

[75] Inventors: Rüdiger Musch; Rüdiger Schubart, both of Bergisch-Gladbach, Fed. Rep. of Germany

[73] Assignee: Bayer Aktiengesellschaft, Leverkusen-Bayerwerk, Fed. Rep. of Germany

[21] Appl. No.: 624,967

[22] Filed: Dec. 10, 1990

[30] Foreign Application Priority Data

Dec. 22, 1989 [DE] Fed. Rep. of Germany ....... 3942463

[51] Int. Cl.$^5$ .............................................. C08F 8/42
[52] U.S. Cl. ................................ 525/368; 525/331.1; 525/372; 525/374; 525/375
[58] Field of Search ................ 528/368, 372, 374, 375

[56] References Cited

U.S. PATENT DOCUMENTS 2,943,078  6/1960  Bacon ............................... 525/331.1

OTHER PUBLICATIONS

Chemical Abstracts, vol. 84, No. 20 (1976) #1370004H.
Database WPI, No. 78-24142A [13], Derwent Publications Ltd., (1978).

*Primary Examiner*—Bernard Lipman
*Attorney, Agent, or Firm*—Connolly & Hutz

[57] ABSTRACT

The metal oxide vulcanization of polychloroprene in the presence of amidine compounds, but in the absence of magnesium oxide, leads to vulcanizates which are capable of withstanding high temperatures, even under dynamic stress.

4 Claims, No Drawings

PROCESS FOR THE VULCANIZATION OF POLYCHLOROPRENE

This invention relates to a process for the vulcanization of polychloroprene in the presence of amidine compounds and in the absence of magnesium oxide. The vulcanizates obtained by the process according to the invention are distinguished by a reduced tendency towards undesirable post-vulcanization.

It is known that polychloroprenes can be vulcanized by treatment with diamines, diphenols, thioureas, metal oxides, etc. In general, a distinction has to be drawn between sulfur-modified types and non-sulfur-modified types. This is because, with sulfur-modified types, it is generally sufficient to use metal oxides alone whereas, with non-sulfur-modified polychloroprenes, special vulcanization accelerators have to be used in addition to the metal oxides on account of the lower tendency of non-sulfur-modified polychloroprenes towards crosslinking; cf. W. Hofmann, Vulkanisation & Vulkanisationshilfsmittel, Verlag Berliner Union GmbH, Stuttgart 1965, page 274.

Among the metal oxides, zinc oxide is typically used as a crosslinking agent while magnesium oxide is mainly used as chlorine acceptor. Although vulcanization begins quickly where zinc oxide is used on its own, crosslinking is inadequate. Although the use of magnesium oxide on its own leads to safer processability, it also leads to very slow vulcanization and to low degrees of vulcanization. Where magnesium oxide and zinc oxide are used together, a synergistic vulcanizing effect and, providing they are mixed in a suitable ratio, a balanced combination of cure time and degree of vulcanization are obtained.

Both with sulfur-modified and with non-sulfur-modified polychloroprenes, the optimum degree of vulcanization is normally not reached and gradual after-crosslinking takes place instead. This gradual after-crosslinking is also regarded as responsible for the ageing behavior of polychloroprene vulcanizates, preferably on exposure to high temperatures and, more particularly, under additional dynamic stress.

It has now surprisingly been found that the vulcanization of polychloroprenes is favorably influenced by the presence of amidine and metal oxide free from magnesium oxide. The resulting vulcanizates age less seriously, as reflected in reduced deterioration of their mechanical properties.

Accordingly, the present invention relates to a process for the vulcanization of polychloroprene in the presence of
1) 0.5 to 20% by weight metal oxide, the metal preferably being selected from groups IIa and IIb of the periodic system, and
2) organic vulcanization accelerator, characterized in that
a) the metal oxide 1) is free from magnesium oxide and
b) the organic vulcanization accelerator contains 0.1 to 10% by weight and preferably 0.2 to 6% by weight of at least one amidine compound,
the percentages by weight being based on polychloroprene.

Polychloroprenes in the context of the present invention are chloroprene polymers which, in addition to polymerized 2-chloroprene units, may contain 0.05 to 30% by weight and preferably 0.1 to 20% by weight, based on chloroprene polymer, copolymerized units of other ethylenically unsaturated monomers or sulfur, i.e. polychloroprenes of the type described, for example, in Houben-Weyl, Methoden der Organischen Chemie, Vol. E20/2, 842–859, Georg Thieme Verlag, Stuttgart—New York, 1987.

They generally have Mooney viscosities (according to DIN 53 523) of 5 to 140 and preferably 10 to 120 (ML 1+4)/100° C. and glass transition temperatures below −25° C..

Preferred ethylenically unsaturated "other monomers" copolymerizable with chloroprene are essentially 2,3-dichlorobutadiene and 1-chlorobutadiene. Sulfur-modified polychloroprenes are preferred.

The quantity of elemental sulfur used for the production of sulfur-modified polychloroprene is from 0 05 to 1.5% by weight and preferably from 0.1 to 1% by weight, based on the monomers used. Where sulfur donors are used, the quantity in which they are used should be gauged in such a way that the sulfur released corresponds to the quantities mentioned above.

The polychloroprenes may be uncrosslinked, i.e. soluble in toluene, or crosslinked. Crosslinking may be achieved by an increased monomer conversion or by the addition of crosslinking monomers during the polymerization reaction.

The polychloroprenes may be produced in known manner, for example by emulsion polymerization at 0° to 70° C. and preferably at 5° to 50° C.

To regulate their viscosity, the polychloroprenes may be produced in the presence of typical chain-transfer agents, such as mercaptans, for example of the type described in DE-OS 30 02 711, GB-PS 1,048,235, FR-PS 2 073 106, or xanthogen disulfides, for example of the type described in DE-AS 1 186 215, in DE-OSS 21 56 453, 23 06 610 and 30 44 811, in EP-PS 53 319, in GB-PSS 512,458 and 952,156 and in U.S. Pat. Nos. 2,321,693 and 2,567,117.

In the case of sulfur-modified polychloroprenes, the desired viscosity may be adjusted by the use of typical peptizing agents, for example of the type described in DE-OSS 1 911 439, 2 018 736, 2 755 074 and 3 246 748, in DE-PS 2 645 920, in EP-A 21 212 and 200 857, in FR-PS 1 457 004 and in U.S. Pat. Nos. 2,264,713, 3,378,538, 3,397,173 and 3,507,825.

The polychloroprenes may of course also consist of mixtures of different chloroprene polymers.

By far the majority of known commercially available polychloroprenes is described in "The Synthetic Rubber Manual", 11th Edition, International Institute of Synthetic Rubber Producers, Inc., Houston/Texas, 1989.

The preferred metal oxide 1) for the process according to the invention is zinc oxide.

Compounds 2) suitable for use in the process according to the invention have the structure

at least once per molecule. Preferred compounds 2) are sulfur-free. Preferred compounds 2) correspond to the following formula

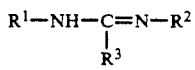

in which

R$^1$ to R$^3$ independently of one another represent a hydrogen atom, a C$_{1-8}$ alkyl radical, a C$_{5-10}$ cycloalkyl radical, a C$_{7-12}$ aralkyl radical, a C$_{6-15}$ aryl radical or a heterocyclic radical containing 5 to 10 carbon atoms and 1 to 2 oxygen, nitrogen and/or sulfur atoms.

Examples of such amidines II are formamidine, acetamidine, N,N'-diphenyl acetamidine, caproyl amidine, benzamidine, N,N-dimethyl benzamidine, N,N-di-n-butyl benzamidine, benzyliminocaprolactam, n-butyl and tert. butyl iminocaprolactam, N-ethyl-N'-benzyl benzamidine, N-tert. butyl-N'-benzylacetamidine and N-n-butylamino-N'-benzyl acetamidine.

A particularly interesting species of the amidines 2) are "cyclic amidines", i.e. compounds of which the nitrogen atoms are members of a ring system. The production of such cyclic amidines is described in S. Patai, "Chemistry of Amidines and Amidates", John Wiley & Sons, New York, 1975, pages 283 to 348.

Preferred cyclic amidines 2) also include imidazolines corresponding to the following formula

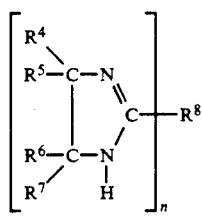

in which

R$^4$ to R$^7$ represent a hydrogen atom, a C$_{1-6}$ alkyl or alkylene radical, a C$_{5-10}$ cycloalkyl radical, a C$_{7-12}$ aralkyl radical, a C$_{6-15}$ aryl radical or a heterocyclic radical containing 5 to 10 carbon atoms and 1 to 2 oxygen, nitrogen and/or sulfur atoms and R$^8$ is a hydrogen atom, a C$_{1-6}$ alkyl or alkylene radical or a C$_{6-18}$ aryl or arylene radical which may be substituted by alkyl cycloalkyl, aralkyl, aryl or heterocyclic radicals (as defined for R$^4$ to R$^7$) and n is the number 1 or 2.

Examples of imidazolines III are 2-phenyl imidazoline, 2-phenyl-4-methyl imidazoline, 2-(m-tolyl)-4-methyl imidazoline, 2-(m-pyridyl)-imidazoline, 1,4-tetramethylene-bis-(4-methyl-2-imidazoline), 2-methyl imidazoline, 2,4-dimeth-yl imidazoline, 2-ethyl imidazoline, 2-ethyl-4-methyl imidazoline, 2-benzyl imidazoline, 2-(o-tolyl)-imidazoline, 2-(p-tolyl)-imidazoline, tetramethylene bis-imidazoline, 1,1,3-trimethyl-1,4-tetramethylene-bis-imidazoline, 1,1,3-trimethyl-1,4-tetramethylene-bis-4-methyl imidazoline, 1,3,3-trimethyl-1,4-tetramethylene-bis-4-methyl imidazoline, 1,2-phenylene bis-imidazoline, 1,3-phenylene bis-4-methyl imidazoline. Mixtures of the imidazoline derivatives may also be used. 2-Phenyl imidazoline and 2-methyl imidazoline are particularly preferred.

Other preferred cyclic amidines 2) include tetrahydropyrimidines corresponding to the following formula

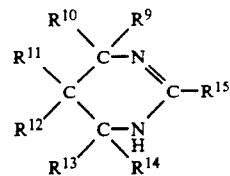

in which

R$^9$ to R$^{15}$ independently of one another represent a hydrogen atom, a C$_{1-6}$ alkyl radical, a C$_{5-10}$ cycloalkyl radical a C$_{7-12}$ aralkyl radical and a C$_{6-15}$ aryl radical; two geminal or vicinal substituents, together with the carbon at which they are situated, may even form a cycloaliphatic ring containing 5 to 6 carbon atoms.

Examples of tetrahydropyrimidines IV are 2-methyl tetrahydropyrimidine, 2,4-, 2,5-, 2,6-dimethyl tetrahydropyrimidine, 2-ethyl tetrahydropyrimidine, 2-ethyl-4-methyl tetrahydropyrimidine, 2-benzyl tetrahydropyrimidine, 2-phenyl tetrahydropyrimidine, 2-phenyl-4-methyl, -5-methyl and -6-methyl tetrahydropyrimidine, 1,8-diazabicyclo-[5.4.0]undec-7-ene (DBU), 1,5-diazabicyclo[4.3.0]non-5-ene (DBN), 2,4-diaza-3-phenyl-7,9,9- and -7,7,9-trimethyl bicyclo[4.3.0]non-2-ene, 2,4-diaza-3-methyl-7,9,9- and -7,7,9-trimethyl bicyclo[4.3.0]-non-2-ene and mixtures of these tetrahydropyrimidines.

The liquid compounds of 2) can be solidified with common adsorberts (for example soot) i.e. 10–30 % by weight of liquid compound 2) with 90–70 % by weight of soot N 762). It is easy to mix the solidified compounds 2) with the other salid compounds.

Given suitably gentle drying, the compounds 2) may even be added to the polychloroprene in the latex phase. Normally, however, the amidine 2) is only added during compounding with other fillers and auxiliaries. Typical "other fillers and auxiliaries" include, for example, dark fillers, such as active and inactive carbon blacks, and also light fillers, such as silica, kaolin, chalk; plasticizers, stabilizers against thermal and/or oxidative degradation, blowing agents and processing aids, such as factice, stearic acid, polyethylene wax and vaseline.

The components may be mixed in standard mixing units. Preferred mixing units are the kneaders, mixing rolls, internal mixers and mixing extruders typically used in the rubber industry which generally operate at shear rates of 1 to 1,000 sec$^{-1}$ and preferably 1 to 200 sec$^{-1}$.

Vulcanization may be carried out at temperatures of 20° to 250° C. and preferably at temperatures of 140° to 210° C., optionally under a pressure of 10 to 200 bar. After vulcanization, the vulcanizates may be conditioned by storage at relatively high temperatures.

"Vulcanized" in the context of the invention means that less than 10% by weight and preferably less than 5% by weight, based on rubber, can be extracted during extraction for 10 hours in a Soxhlet using toluene as the extractant.

The vulcanizates produced in accordance with the invention may be used with advantage for any applications where exposure to high temperatures and dynamic stressing bring with them the risk of premature ageing, i.e. for example axle collars, V belts, gear belts, conveyor belts, buffers, spring elements and also cooling hoses.

EXAMPLES

Starting Components

A 1,8-diazabicyclo[5.4.01]undec-7-ene (DBN) was prepared in accordance with Oedinger et al. synthesis 1972. pages 591–598. A colorless liquid of Bp. 98°–99° C./14 mbar was obtained.
  B. 2,4-dimethyl imidazoline
  C. 2-phenyl-2-imidazoline
  D. N-phenyl acetamidine

Polychloroprene E

The aqueous phase (W) and the monomer phase (M) are introduced in a constant ratio via a measuring and control unit into the first reactor of a polymerization cascade consisting of 7 identical reactors each with a volume of 50 liters; the activator phase (A) is also introduced into the same reactor. The average residence time per reactor is 25 minutes.

| (M) = monomer phase | |
|---|---|
| Chloroprene | 100.0 parts |
| n-Dodecyl mercaptan | 0.22 part |
| Phenothiazine | 0.015 part |
| (W) = aqueous phase | |
| Deionized water | 130.0 parts |
| Sodium salt of dispropionated abietic acid | 2.8 parts |
| Sodium salt of a condensation product of naphthalene sulfonic acid and formaldehyde | 0.7 part |
| Potassium hydroxide | 0.63 part |
| (A) = activator phase | |
| 1% by weight aqueous formamidine sulfinic acid solution | 0.05 part |

The reaction begins readily at an internal temperature of 40° C. The heat of polymerization liberated is dissipated by external cooling and the polymerization temperature is kept at 45° C. The reaction is terminated at a monomer conversion of 65% by an addition of phenothiazine. The remaining monomer is removed from the polymer by distillation with steam and, after the pH value has been lowered to 7.0, the polymer latex is frozen out on a cooling roller and isolated. The Mooney viscosity is 48 (ML 1+4) 100° C.

Polychloroprene F (sulfur modified)

The aqueous phase consisting of 120 parts deionized water, 3.25 parts unmodified resinic acid based on wood resin, 1.1 parts potassium hydroxide, 0.7 part of the Na salt of the condensation product of naphthalene sulfonic acid and formaldehyde and 0.03 part of the Na salt of anthraquinone-B-sulfonic acid, purged with nitrogen and heated to 40° C. 100 Parts nitrogen-purged chloroprene were then added. After the temperature had been adjusted to 40° C., 0.3 part sulfur (50% aqueous dispersion) was added. 0.9 part Na dibutyl dithiocarbamate (30% aqueous solution) was then added.

The polymerization reaction was activated by addition of 0 03 part $K_2S_2O_8$ in the form of a nitrogen-purged 4% aqueous $K_2S_2O_8$ solution. During the test, $2.25 \cdot 10^{-3}$ parts $K_2S_2O_8$ per minute were added in the form of this aqueous nitrogen-purged persulfate solution.

The course of the polymerization reaction was followed gravimetrically from samples removed during the reaction. The polymerization reaction was terminated at a monomer conversion of 66% by addition of 0.03 part, based on latex, of a 2.5% solution of diethyl hydroxylamine and 1.0 part tetraethyl thiuram disulfide (TETD) in the form of a 10% dispersion in toluene was added to the latex.

The latex was degassed to approx. 500 ppm residual chloroprene (based on latex), the degassed latex was adjusted to pH 6 with 20% acetic acid, the polymer was isolated by low-temperature coagulation, washed with deionized water and dried to a residual moisture content of $\leq 0.5\%$. The polymer had a Mooney viscosity of 47 (ML 1+4) 100° C.

Polychloroprene G (chloroprene/1-chlorobutadiene copolymer)

A monomer mixture of 98 parts chloroprene and 2 parts 1-chlorobutadiene was polymerized in the same way as described above for polychloroprene E. The Mooney viscosity of the copolymer obtained was 46 (ML 1+4) 100° C.

Testing of Vulcanizates

Preparation of the mixture, vulcanization and testing of the vulcanizates was carried out in accordance with ISO specification 2475-1975 (E).

Before the mixture was actually prepared, 1,000 g polychloroprene were masticated for 6 minutes, the gap between the rollers being adjusted in such a way that an approximately 12 mm diameter bead was formed. After mastication, 800 g rubber were removed and stored for at least 10 minutes and for at most 120 minutes.
  Rollers 200×390 mm
  Temperature 45°–55° C.
  Friction 1:1.4 (24:34 r.p.m.)

Before the beginning of mixing, the rollers adjusted to 30° C. were heated by waste rubber to the indicated lower limit of the operating temperature.

| Test mixture | |
|---|---|
| Constituents: | |
| Polychloroprene | 100.00 g |
| Stearic acid | 0.50 g |
| Magnesium oxide | variable |
| Phenyl-$\beta$-naphthylamine | 2.00 g |
| Carbon black N 762 | 30.00 g |
| Zinc oxide | 5.00 g |
| Ethylene thiourea | variable |
| DBN | variable |
| | 137.50 g |

The mixing sequence and mixing times were as described above. After a mixing time of 13 minutes, the web was compounded for 1 minute with alternating incisions (three times left and three times right) and was drawn six times through a 0.8 mm wide roller gap over a period of another 2 minutes, so that the total mixing time was 16 minutes.

The mixture was stored overnight pending vulcanization.

Vulcanization Conditions

Temperature 150° C. 170° C. and 190° C.
Time 40 mins., 5/10 mins.

The test data were determined in accordance with corresponding DIN specifications for soft rubber.

| I. Effect of various metal oxides on vulcanization behavior | | | | | | |
|---|---|---|---|---|---|---|
| Example: | 1* | 2* | 3* | 4* | 5* | 6 |
| Polychloroprene E | 100.0 | | | | | |

I. Effect of various metal oxides on vulcanization behavior

| Example: | 1* | 2* | 3* | 4* | 5* | 6 |
|---|---|---|---|---|---|---|
| Stearic acid | 0.5 | | | | | |
| Phenyl-β-naphthylamine | 2.0 | | | | | |
| Carbon black N 762 | 30.0 | | | | | |
| Zinc oxide | 5.0 | | | | | |
| Ethylene thiourea | 0.5 | | | | | |
| Magnesium oxide | — | 4 | — | — | — | — |
| Calcium oxide | — | — | 4 | — | — | — |
| Aluminium hydroxide | — | — | — | 4 | — | — |
| Magnesium hydroxide | — | — | — | — | 4 | — |
| DBN | — | — | — | — | — | 1 |
| Mixture properties | | | | | | |
| Vulcameter (BAYER-FRANK, running time 40 mins.) | | | | | | |
| *Temperature 150° C.* | | | | | | |
| $T_{10}$ (mins.) | 2 | 3 | 2 | 2 | 2 | 3 |
| $T_{80}$ (mins.) | 10 | 19 | 8 | 10 | 12 | 17 |
| $T_{90}$ (mins.) | 16 | 26 | 15 | 16 | 21 | 26 |
| Shear modulus maximum (N) | 25 | 39 | 22 | 25 | 28 | 39 |
| *Temperature 170° C.* | | | | | | |
| $T_{10}$ (mins.) | 1 | 2 | 1 | 1 | 1 | 2 |
| $T_{80}$ (mins.) | 4 | 8 | 14 | 4 | 6 | 7 |
| $T_{90}$ (mins.) | 11 | 14 | 27 | 11 | 14 | 10 |
| Shear modulus maximum (N) | 25 | 42 | 25 | 25 | 29 | 39 |
| *Temperature 190° C.* | | | | | | |
| $T_{10}$ (mins.) | 1 | 1 | 1 | 1 | 1 | 1 |
| $T_{80}$ (mins.) | 3 | 4 | 10 | 3 | 4 | 3 |
| $T_{90}$ (mins.) | 8 | 10 | 25 | 7 | 9 | 5 |
| Shear modulus maximum (N) | 24 | 44 | 28 | 25 | 29 | 40 |

\* = Comparison Examples

By comparison with the MgO-containing comparison addition (Example 2), the addition according to the invention (Example 6) produces identical vulcanization behavior at 150° C. and distinctly faster vulcanization behavior at a higher temperature, the crosslink density of the vulcanizate, as measured from the shear modulus maximum, being unchanged in relation to the MgO-containing mixture. This is a considerable advantage. In the absence of MgO (Example 1) or if MgO is replaced by other metal oxides (Examples 3 to 5), the result in every case is undercrosslinking, as reflected in the low shear modulus value.

II. Effect on vulcanizate values and ageing behavior
Vulcanizate (10 mins. 190° C./values measured on S-II test specimens)

| Example | | 1* | 2* | 6 |
|---|---|---|---|---|
| Tensile strength | (MPa) | 17.2 | 16.8 | 18.4 |
| Elongation at break | (%) | 510 | 390 | 400 |
| Modulus at 100% E. | (MPa) | 1.5 | 2.3 | 2.1 |
| Modulus at 300% E. | (MPa) | 8.1 | 12.4 | 13.0 |
| Hardness/23° C. | (Shore A) | 54 | 62 | 60 |
| Elasticity | (%) | 49 | 50 | 52 |
| Hot-air ageing (21 days/100° C.) | | | | |
| Change in mechanical values: | | | | |
| Tensile strength | (%) | −8 | −20 | −10 |
| Elongation at break | (%) | −26 | −35 | −10 |
| Modulus (100) | (%) | 115 | 120 | 15 |
| Hardness | (Shore A) | 11 | 9 | 2 |

\* = Comparison Examples

As the comparison shows, the MgO-free crosslinker system of Example 1 leads to poor mechanical properties of the vulcanizate.

The replacement of MgO of Example 2 by DBN in Example 6 leads to higher tensile strength for otherwise comparable mechanical vulcanizate data and to considerably more favorable ageing behavior as demonstrated, for example, by hot air ageing at 100° C. (It is precisely the increase in hardness and modulus of the ageing rubber article that are crucial factors in its premature failure).

III. Vulcanizate data as a function of the crosslinker system

| Example | 7* | 8* | 9 | 10 | 11* |
|---|---|---|---|---|---|
| Polychloroprene G | 100.0 | | | | |
| Stearic acid | 0.5 | | | | |
| Phenyl-β-naphthylamine | 2.0 | → | → | → | → |
| Carbon black N 762 | 30.0 | | | | |
| Zinc oxide | 5.0 | | | | |
| ETU | 0.5 | | | | |
| Magnesium oxide | 4.0 | 4.0 | — | — | — |
| DBN | — | 1.0 | 1.0 | 0.5 | — |
| Vulcameter (BAYER-FRANK; 190° C./40 mins.) | | | | | |
| Shear modulus maximum (N) | 49 | 45 | 40 | 37 | 25 |
| Vulcanizate (190° C., 10 mins; measured on rings) | | | | | |
| Tensile strength | 16.7 | 16.7 | 17.5 | 20.3 | 18.0 |
| Elongation at break | 410 | 400 | 430 | 470 | 550 |
| Modulus at 100% E (MPa) | 1.8 | 2.0 | 1.6 | 1.6 | 1.1 |
| Modulus at 300% E. (Mpa) | 11.0 | 12.7 | 10.8 | 10.5 | 6.7 |
| Hardness/23° C. (Shore A) | 61 | 62 | 59 | 58 | 54 |
| Hot air ageing (14 days/100° C.) | | | | | |
| Fall in elongation in % | 18 | 13 | 10 | 10 | 25 |
| Increase in modulus in % | 50 | 40 | 30 | 35 | 100 |
| Increase in Shore A hardness | 5 | 4 | 2 | 3 | 6 |

\* = Comparison Examples

Compared with the standard crosslinker system in Example 7, the addition of DBN in the absence of MgO produces a distinct improvement in the mechanical properties before and after ageing (Examples 9, 10).

IV. Effect of the crosslinker on sulfur-modified polychloroprene

| Example | 12* | 13* | 14 |
|---|---|---|---|
| Polychloroprene F | 100.0 | | |
| Stearic acid | 0.5 | | |
| Phenyl-β-naphthylami | 2.0 | → | → |
| Carbon black N 762 | 30.0 | | |
| Zinc oxide | 5.0 | | |
| Magnesium oxide | — | 4.0 | — |
| DBN | — | — | 1.0 |
| Vulcanization (BAYER-FRANK vulcameter; 190° C./40 mins) | | | |
| $T_{10}$ (mins.) | 1.1 | 1.4 | 1.2 |
| $T_{80}$ (mins.) | 2.0 | 3.0 | 2.0 |
| $T_{90}$ (mins.) | 3.0 | 4.0 | 3.0 |
| Shear modulus maximum (N) | 27 | 29 | 32 |

Vulcanizate (190° C., 5/10 mins; values of S-II specimens)

| Example | 12* | 12* | 13* | 13* | 14 | 14 |
|---|---|---|---|---|---|---|
| Vulc. time | 5 | 10 | 5 | 10 | 5 | 10 |
| Tensile strength (MPa) | 29.0 | 26.6 | 27.3 | 26.0 | 25.8 | 28.5 |
| Elongation at break (%) | 840 | 770 | 720 | 640 | 670 | 710 |
| Modulus at 100% E. (MPa) | 1.4 | 1.3 | 1.9 | 2.1 | 1.6 | 1.6 |
| Modulus at 100% E. (MPa) | 6.0 | 6.2 | 8.7 | 9.5 | 8.6 | 8.6 |

Ageing of vulcanizate 190° C., 5 mins.:
7 days/125° C., measured on rings

| | | | | |
|---|---|---|---|---|
| Modulus 100% E. 0 days (MPa) 7 days | 1.7 6.4 | — — | 1.5 3.8 | — — |
| Increase in modulus in % | 276 | — | 153 | — |
| Hardness/23° C. (Shore A) 0 days 7 days | 60 76 | — — | 57 66 | — — |

| -continued | | | | |
|---|---|---|---|---|
| IV. Effect of the crosslinker on sulfur-modified polychloroprene | | | | |
| Change in hardness in % | 27 | — | 16 | — |

\* = Comparison Examples

Sulfur-modified polychloroprene is used in particular when good mastication during mixing is necessary, when thiourea-free vulcanization is required and where articles of high dynamic strength are to be produced.

As can be seen, the mechanical values of the Examples according to the invention do not change (modulus) or are improved (strength, elongation) with increasing vulcanization time. Ageing under intensified conditions at 125° C. as opposed to 100° C. shows the effectiveness of DBN over the conventional crosslinker system particularly clearly.

V. EFFECT OF VARIOUS AMIDINE COMPOUNDS ON AGEING BEHAVIOR

The mixing and vulcanization conditions were the same as described in Example 6.

Changes in the mechanical values

Vulcanization (190° C./10 mins) after hot air ageing (21 days/100° C.)

| Examples | 6 | 15 | 16 | 17 |
|---|---|---|---|---|
| Amidine A | 1 | — | — | — |
| B | — | 1 | — | — |
| C | — | — | 1 | — |
| D | — | — | — | 1 |
| Elongation at break (%) | −10 | −5 | −15 | −10 |
| Modulus (100% E) · (MPa) | 15 | 25 | 20 | 20 |
| Hardness/23° C. (Shore A) | 2 | 3 | 3 | 4 |

We claim:

1. A process for the vulcanization of polychloroprene in the presence of
   i) 0.5 to 20% by weight metal oxide and
   ii) organic vulcanization accelerator,
   characterized in that
   a) the metal oxide i) is free from magnesium oxide and
   b) the organic vulcanization accelerator contains 0.2 to 0.6% by weight of at least one amidine compound,
   the percentages being based on polychloroprene.

2. A process as claimed in claim 1, in which the metal of the metal oxide is selected from groups IIa and IIIb of the periodic system.

3. A process as claimed in claim 1, in which the metal oxide i) is zinc oxide.

4. A process for the vulcanization of polychloroprene in the presence of
   i) 0.5 to 20% by weight metal oxide and
   ii) organic vulcanization accelerator, wherein
   a) the metal oxide i) is free from magnesium oxide and
   b) the organic vulcanization accelerator contains 0.2 to 0.6% by weight of at least one 1,8-diazabicyclo[5.4.0]undec-7-ene or 1,5-diazabicyclo[4.3.0]non-5-ene,
   wherein percentages are based on polychloroprene.

* * * * *